United States Patent [19]

Kurihara et al.

[11] Patent Number: 4,757,449
[45] Date of Patent: Jul. 12, 1988

[54] AUTOMATIC TRANSMISSION SYSTEM FOR VEHICLES

[75] Inventors: Kazumasa Kurihara; Kenji Arai, both of Higashimatsuyama, Japan

[73] Assignee: Diesel Kiki Co., Ltd., Tokyo, Japan

[21] Appl. No.: 799,778

[22] Filed: Nov. 20, 1985

[30] Foreign Application Priority Data

Nov. 8, 1984 [JP] Japan ................... 59-234192

[51] Int. Cl.⁴ .............. B60K 41/08; G05D 13/58
[52] U.S. Cl. ......................... 364/424.1; 74/866; 364/426
[58] Field of Search ........... 364/424.1, 426; 74/866; 192/0.052, 0.073, 0.076

[56] References Cited

U.S. PATENT DOCUMENTS

| | | | |
|---|---|---|---|
| 4,539,643 | 9/1985 | Suzuki et al. | 364/424.1 |
| 4,541,052 | 9/1985 | McCulloch | 364/424.1 |
| 4,576,065 | 3/1986 | Speranza et al. | 364/424.1 |
| 4,614,258 | 9/1986 | Fukunaga | 192/0.052 |
| 4,637,278 | 1/1987 | Nishikawa et al. | 364/424.1 |

Primary Examiner—Felix D. Gruber
Attorney, Agent, or Firm—James Creighton Wray

[57] ABSTRACT

An automatic transmission system for a vehicle in which the gear change operations are carried out in response to a condition signal relating to the speed of an internal combustion engine, which is determined by detecting the operating speed of a brake pedal of the vehicle and a variable filter circuit for receiving the condition signal and for removing any high frequency component of the condition signal, the frequency response characteristics of the variable filter circuit being changeable in response to the operating speed of a brake pedal means. The system is controlled in response to an output signal derived from the variable filter circuit so as to shift the transmission into a gear position determined on the basis of a predetermined map data in response to the operating condition of the vehicle at each instant, whereby the gear change operation can be carried out so as to match the actual operating condition of the vehicle.

7 Claims, 4 Drawing Sheets

AUTOMATIC TRANSMISSION SYSTEM FOR VEHICLES

BACKGROUND OF THE INVENTION

The present invention relates to an automatic transmission system for vehicles employing a gear-type transmission, in which the gear change operation of the gear-type transmission is automatically carried out in accordance with the operating condition of the vehicle at each instant, and more particularly to an automatic transmission system which is capable of changing gears in accordance with the operating condition of the vehicle so as not to impair stable operation of the internal combustion engine of the vehicle.

In the prior art, there have been proposed various automatic transmission systems for vehicles comprising a gear-type transmission with an actuator for changing gears in response to electric signals, and a gear change map for determining the appropriate gear position on the basis of at least the engine speed, whereby the transmission is automatically shifted into the gear based on the gear change map.

In the case where the gear position of the gear-type transmission is determined in accordance with the engine speed, when small changes arise in the engine speed for some reason, undesired gear change operation may be effected in response to the small changes to interfere with the desired control operation. To eliminate this disadvantage, the signal indicating the engine speed in the automatic transmission system is filtered by use of a low-pass filter to prevent the automatic transmission system from being shifted in response to small changes in the engine speed.

However, with this construction, when the operating condition of the engine is suddenly changed, for example, due to hard braking, the signal indicating the engine speed is not able to change in response to the quick change in the operating condition. As a result, the transmission is shifted into an inappropriate gear position for the operating condition of the vehicle at that time, so that the operation of the engine becomes unstable and may be caused to stop.

SUMMARY OF THE INVENTION

It is an object of the present invention to provide an improved automatic transmission system for vehicles using a gear-type transmission.

It is another object of the present invention to provide an automatic transmission system for vehicles which is responsive to sudden changes in the engine speed but is not responsive to the small changes in the engine speed occurring in normal operating condition.

According to the present invention, in an automatic transmission system for a vehicle in which the gear change operations are carried out in response to electric signals, the system has means for producing a condition signal relating to the speed of an internal combustion engine for providing driving power to the vehicle, a detecting means for detecting the operating speed of a brake pedal of the vehicle and a filtering means for receiving the condition signal and for removing any high frequency component of the condition signal. The frequency response characteristics of the filtering means are changeable in response to the output of the detecting means and the system is controlled in response to an output signal derived from the filtering means so as to shift the transmission into a gear position determined on the basis of a predetermined map data in response to the operating condition of the vehicle at each instant.

The frequency response characteristics of the filtering means are determined in response to the operating speed of the brake pedal in such a way that the response time is set to be relatively long during normal operating condition of the internal combustion engine in which the engine speed changes relatively slowly, whereas the response time is set to be relatively short when the engine speed changes quickly, for example, owing to hard braking.

With this construction, the automatic transmission system operates in response to only the slow change in the engine speed when the engine is operated with relatively slow changes and unstable operation of the internal combustion engine will be effectively prevented. In contrast, when the engine speed is changed quickly, the automatic transmission system operates in response to the quick change in the operating condition of the internal combustion engine.

As a result, the gear change operation of the automatic transmission system can be carried out so as to match the actual operating condition of the vehicle.

The invention will be better understood and other objects and advantages thereof will be more apparent from the following detailed description of preferred embodiments with reference to the accompanying drawings.

DETAILED DESCRIPTION OF THE INVENTION

Figure 1:
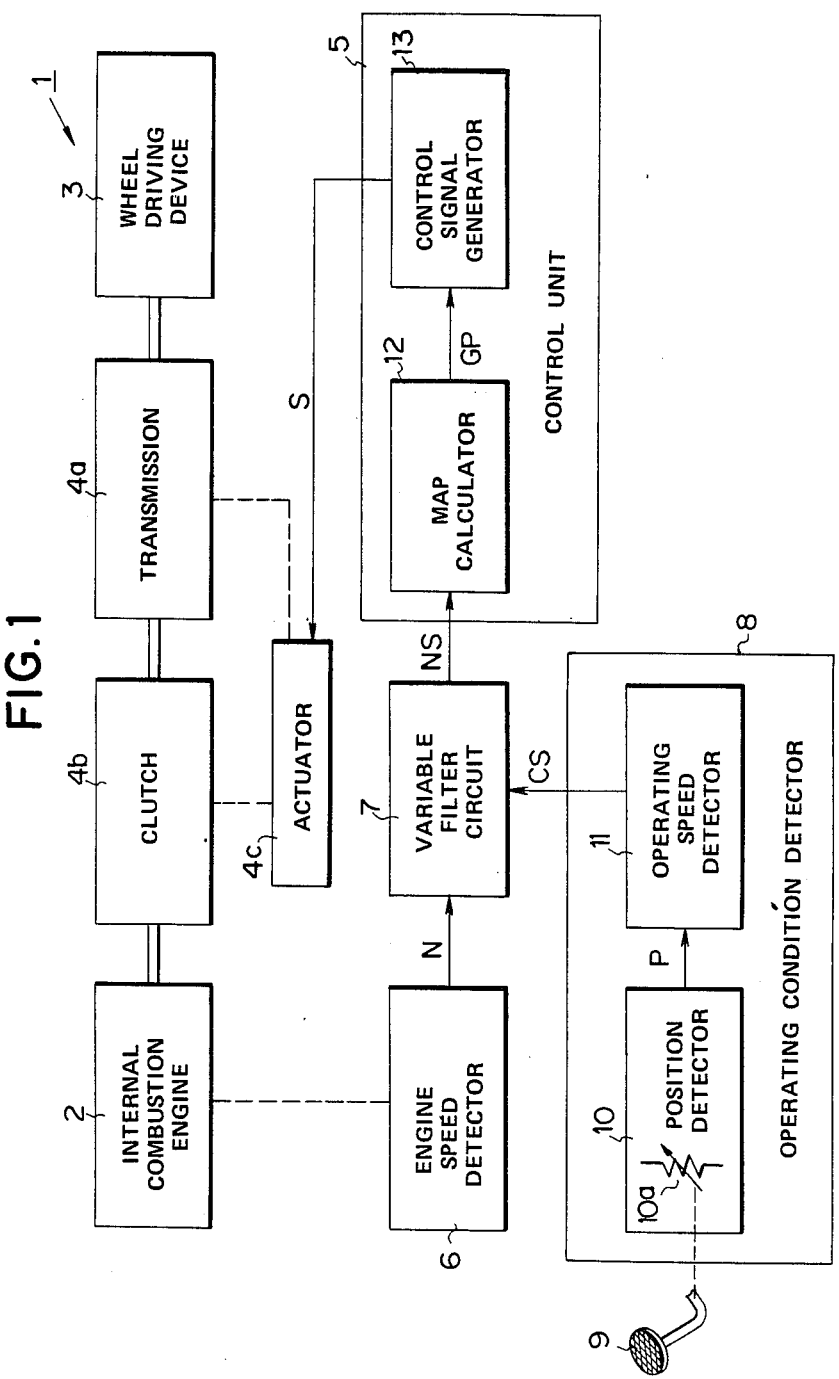
FIG. 1 is a block diagram of a first embodiment of the automatic transmission according to the present invention.

FIG. 1 shows a block diagram of an embodiment of an automatic transmission system for vehicles according to the present invention. The automatic transmission system 1 has a gear-type transmission 4a and a clutch 4b which are located between an internal combustion engine 2 for driving a vehicle (not shown) and a wheel driving device 3, an actuator 4c associated with the transmission 4a and the clutch 4b for operating them in order to shift the transmission 4a to the desired gear position, and a control unit 5 for controlling the actuator 4c in order to carry out automatic gear change operation of the transmission 4a.

The gear-type transmission 4a is a conventional three-speed gear box and, though not shown in FIG. 1, the actuator 4c is comprised of two separate actuators, one for operating the transmission 4a and the other for operating the clutch 4b. The transmission 4a and the clutch 4b are operated by the actuator 4c so as to shift the gear position of the transmission 4a in accordance with a control signal S from the control unit 5. Since devices for shifting a gear-type transmission in response to an electric signal are known, no detailed description of the construction of the actuator 4c will be given here.

The automatic transmission system 1 has an engine speed detector 6 which is associated with the internal combustion engine 2 and produces an analog engine speed signal N the level of which varies in accordance with the speed of the internal combustion engine 2. The engine speed detector 6 for producing the engine speed signal N can be easily constructed by the use of the conventional speed sensor composed of, for example, a pulser secured to the crankshaft of the internal combustion engine 2 and an associated electromagnetic pick-up coil.

In order to remove the high frequency components of the engine speed signal N, the engine speed signal N is applied to a variable filter circuit 7 the frequency response characteristics of which are controllable by a condition signal CS from an operating condition detector 8 for detecting the operating condition of a brake pedal 9.

The operating condition detector 8 has a position detector 10 including a potentiometer 10a which is associated with the brake pedal in such a way that the resistance value of the potentiometer 10a is changed in accordance with the amount of operation of the brake pedal 9. The position detector 10 produces a position signal P which has a level corresponding to the amount of depression of the brake pedal 9 in response to the change in the resistance of the potentiometer 10a. The position signal P is applied to an operating speed detector 11 which is arranged as a differentiating circuit, in which the position signal P is differentiated to obtain the condition signal CS indicating the operating speed of the brake pedal 9 at each instant. In this embodiment, the level of the condition signal CS is determined so as to become higher as the operating speed of the brake pedal 9 is higher, while the variable filter circuit 7 is arranged in such a way that the frequency response becomes faster when the level of the condition signal CS becomes higher. As a result, the variable filter circuit 7 may allow the more high frequency components to pass therethrough as the operating speed of the brake pedal 9 is faster.

The signal obtained by filtering the engine speed signal N as described above in accordance with the frequency response characteristics depending on the condition signal CS is output as a corrected speed signal NS from the variable filter circuit 7.

The control unit 5 has map unit 12 for determining a target gear position in response to the corrected speed signal NS. The map unit 12 has map data corresponding to certain gear change characteristics and the target gear position for the engine speed at that time is determined on the basis of the map data in response to the corrected speed signal NS. A signal indicating the result from the map unit 12 is output as a gear position signal GP, which is applied to a control signal generator 13 for producing the control signals S for operating the actuator 4c so as to shift the transmission 4a into the gear position indicated by the gear position signal GP.

The operation of the automatic transmission system 1 will be now described.

Figure 2:
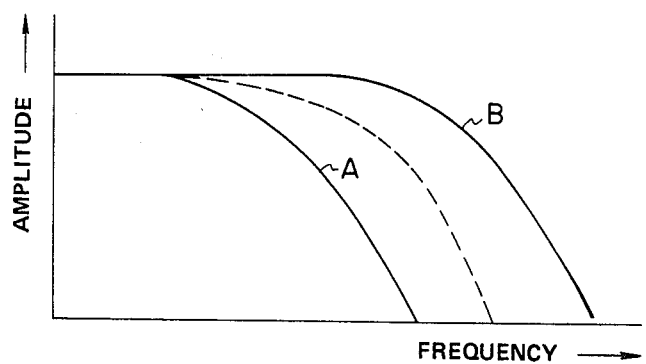
FIG. 2 is a graph showing frequency response characteristic curves of the variable filter circuit of the automatic transmission system of FIG. 1.

When the operation of the brake pedal 9 is carried out at relatively low speed, so that the level of the condition signal CS is relatively low, the frequency response characteristics of the variable filter circuit 7 are controlled in accordance with the level of the condition signal CS so as to become the response curve A shown in FIG. 2. More specifically, the time constant of the variable filter circuit 7 is controlled so as to be relatively large, so that the high frequency component in the engine speed signal N is rejected by the variable filter circuit 7. As a result, the corrected speed signal NS has no such high frequency component corresponding to small changes in the engine speed and the gear change operation of the transmission 4a can be performed stably in response to the corrected speed signal NS.

When the rate of operation of the brake pedal 9 becomes large, for example, owing to hard braking, the level of the condition signal CS becomes large. Therefore, in this case, the frequency response characteristics of the variable filter circuit 7 are controlled to assume a high response condition as compared with the case where the rate of operation of the brake pedal 9 is small. More specifically, the time constant of the variable filter circuit 7 is controlled so as to be small as shown by the curve B in FIG. 2. As a result, the high frequency component in the engine speed signal N is able to pass through the variable filter circuit 7, so that the gear change operation of the transmission 4a can be carried out with excellent response speed matched to the actual speed of the internal combustion engine 2. Consequently, unstable operation or stopping of the internal combustion engine can be prevented even when the vehicle is braked hard.

In the embodiment of FIG. 1, the frequency response characteristics of the variable filter circuit 7 are steplessly controllable between the curves A and B of FIG. 2 in response to the level of the electric signal applied thereto. However, the frequency response characteristic of the variable filter circuit 7 may instead be changed stepwise in response to the level of the condition signal CS.

Figure 3:
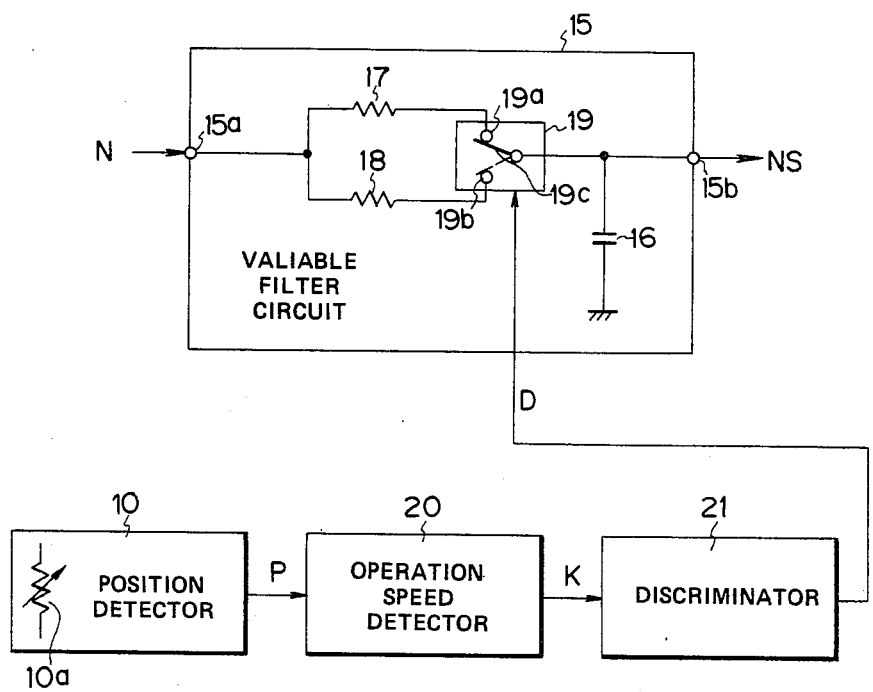
FIG. 3 is a block diagram of a second embodiment of the automatic transmission according to the present invention.

In FIG. 3, there is shown an important portion of another embodiment of the present invention, in which the frequency response characteristics of a variable filter circuit are changed to a fast mode or slow mode in response to the rate of operation of the brake pedal 9. A variable filter circuit 15 is formed as an R-C low-pass filter circuit arranged by the use of a capacitor 16 and two resistors 17 and 18. In this case, the value of the resistor 17 is selected to be larger than that of the resistor 18. One terminal of each of the resistors 17 and 18 is connected to an input terminal 15a to which the engine speed signal N is applied. The other terminals of the resistors 16 and 17 are connected to fixed contacts 19a and 19b, respectively, of a switch 19 and the movable contact 19c of the switch 19 is connected to the output terminal 15b of the variable filter circuit 15 and one terminal of the capacitor 16, the other terminal of which is grounded.

The position signal P from the position detector 10 is applied to an operation speed detector 20, wherein the operating speed of the brake pedal 9, that is, the rate of the operation of the brake pedal 9, is calculated on the basis of the position signal P to produce an operation speed signal K indicating the operating speed of the brake pedal 7. The operation speed signal K is applied to a discriminator 21 for discriminating whether or not the operating speed of the brake pedal 9 is larger than a predetermined level and for producing a discrimination signal D indicating the result of the discrimination. In this embodiment, the level of the discrimination signal D becomes "H" when the operating speed of the brake pedal 9 is larger than the predetermined level and becomes "L" when it is not larger than the predetermined level. The discrimination signal D is applied to the switch 19 of the variable filter circuit 15 as a switching control signal.

The switch 19 is switched over as shown by the solid line when the level of the discrimination signal D is "L", while the switch 19 is switched over as shown by the broken line when the level is "H". When the switch 19 is switched as shown by the solid line in FIG. 3, the frequency response characteristics become as shown by the curve A in FIG. 2. On the other hand, when the switch 19 is switched as shown by the broken line in FIG. 3, the characteristics become as shown by the curve B in FIG. 2.

Therefore, the frequency response characteristics of the variable filter circuit 15 are selectively changed into low response mode indicated by the curve A or high response mode indicated by the curve B in accordance with the operating speed of the brake pedal 9.

Furthermore, the frequency response characteristics of the variable filter circuit 15 may be changed in a plurality of steps in response to the level of the output from the operation speed detector 20.

Figure 4:
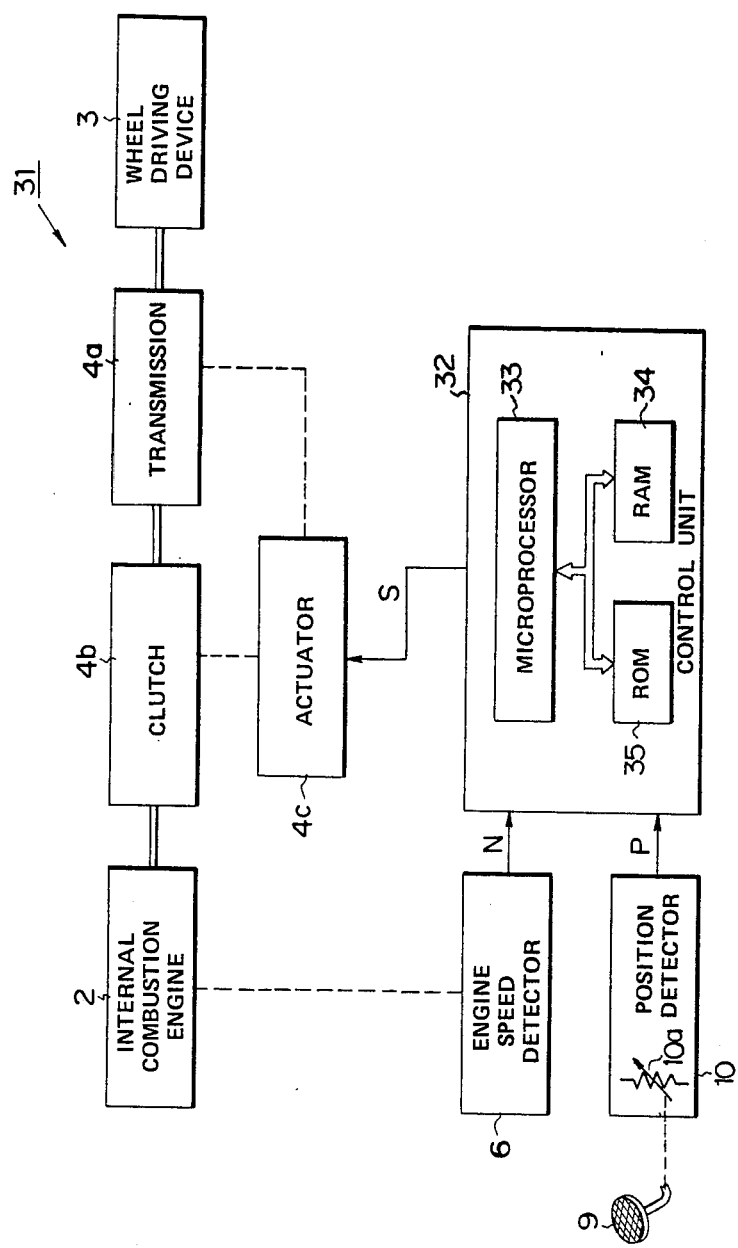
FIG. 4 is a block diagram of a third embodiment of the same.

FIG. 4 shows a block diagram of another embodiment of an automatic transmission system according to the present invention. The automatic transmission system 31 has a control unit 32 which corresponds to the control unit 5, the variable filter circuit 7 and the operating speed detector 11 of FIG. 1 and includes a microprocessor 33, a random access memory (RAM) 34 and a read only memory (ROM) 35 in which a control program is stored. The control program is executed in the microprocessor 33 and the control unit 32 is able to perform the same control function as that of the combination of the control unit 5, the variable filter circuit 7 and the operating speed detector 11. The control unit 32 receives the engine speed signal N and the position signal P to produce a control signal S.

Figure 5:
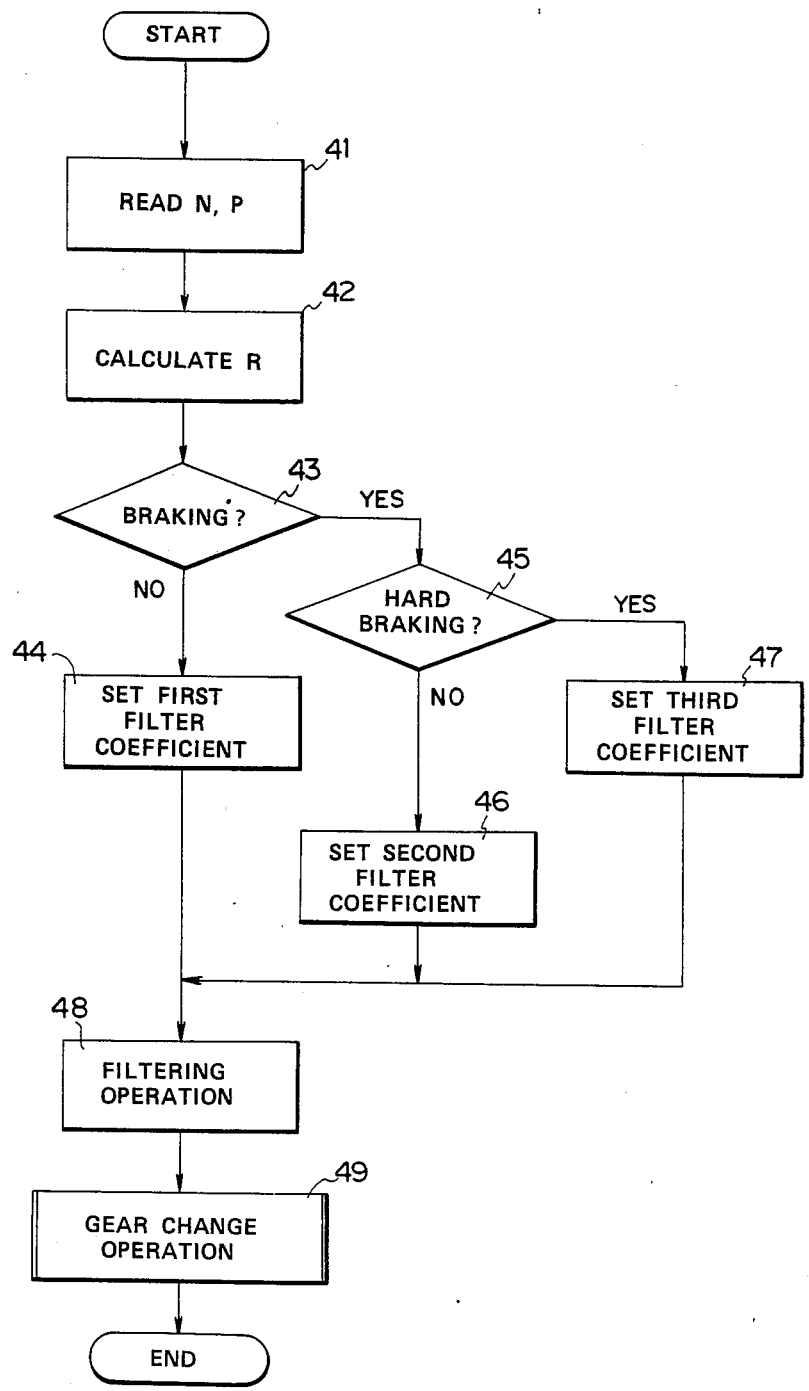
FIG. 5 is a flow chart representing a program executed by the microprocessor of the third embodiment shown in FIG. 4.

FIG. 5 shows a flow chart of the control program stored in the ROM 35. After the start of the control program, the operation moves to step 41 wherein the engine speed signal N and the position signal P are read in. After this, the operation moves to step 42 wherein the rate of operation R of the brake pedal 9 is calculated on the basis of the position signal P read in step 41. After this, the operation moves to step 43 wherein a decision is made on the basis of the calculated result in step 42 as to whether braking operation is being carried out.

When the decision in step 43 is NO, the operation moves to step 44 wherein a first filter coefficient matched to the no braking operation state is calculated. Then, in step 48 the filtering calculation for filtering the engine speed signal N is carried out on the basis of the first filter coefficient and the filtered engine speed signal N is obtained as a corrected speed signal NS. The operation then moves to step 49 and the gear change operation is carried out in accordance with the corrected speed signal NS obtained in step 49.

When the decision in step 43 is YES, the operation moves to step 45 wherein another decision is made as to whether the braking operation is hard braking. When the decision in step 45 is NO, the operation moves to step 46 wherein a second filter coefficient matched to the normal braking operation is calculated and the filtering calculation for filtering the engine speed signal N is carried out on the basis of the second filter coefficient obtained in step 46.

When the decision in step 45 is YES, the operation moves to step 47 wherein a third filter coefficient matched to the hard braking operation is calculated and the filtering calculation for filtering the engine speed signal N is carried out on the basis of the third filter coefficient.

Thus, the coefficient of the filtering operation for the engine speed signal N is set depending upon the rate of operation R of the brake pedal 9. As will be understood from the foregoing description, the filtering operation according to the first filter coefficient provides low response characteristics corresponding to the curve A in FIG. 2, and the filtering operation according to the third filter coefficient provide high response characteristics corresponding to the curve B in FIG. 2. The filtering operation according to the second filter coefficient provides medium response characteristics between the curves A and B as shown by a broken line in FIG. 2. That is, in this case, the frequency response characteristics are change in three steps depending upon the operating speed of the brake pedal 9.

As a result, the averaging operation for the engine speed N is carried out with low response speed, that is, large time constant, when the brake pedal is not operated, so that the transmission system 1 does not respond to the fast change component in the speed change of the internal combustion engine 2. Consequently, stable gear change control can be performed.

On the other hand, in the case where the brake pedal 9 is operated, the frequency response characteristic is changed in two steps depending upon the operating speed of the brake pedal 9, so that the gear change operation of the transmission 4a is controlled in accordance with the relatively quick change of the internal combustion engine 2. Consequently, stable operation of the internal combustion engine 2 can be assured.

Thus, the gear change operation is controlled so as to match to the actual operating condition of the internal combustion engine 2. Therefore, even when the engine speed suddenly changes, the operation of the internal combustion engine is effectively prevented from becoming unstable.

What is claimed is:

1. An automatic transmission system for a vehicle having an actuating means responsive to an electric signal for carrying out a gear change operation, said system comprising:
   means for producing a condition signal relating to the speed of an internal combustion engine for providing driving power to the vehicle;
   a detecting means for detecting the operating speed of a brake pedal of the vehicle;
   a filtering means responsive to the condition signal for removing a high frequency component from the condition signal, the frequency response characteristics of said filtering means being changeable in response to the output from said detecting means; and
   a control means responsive to the output from said filtering means for producing a control signal for operating the actuating means so as to perform the desired gear change operation.

2. A system as claimed in claim 1 wherein said control means has a determining means responsive to at least the output from said filtering means for determining the gear position on the basis of map data corresponding to a predetermined gear change characteristic and a producing means responsive to the result of the determination by said determining means for producing said control signal.

3. A system as claimed in claim 1 wherein said detecting means has a position detecting means for generating a position signal relating to the position of the brake pedal and means responsive to said position signal for producing a condition signal relating to the operating speed of the brake pedal.

4. A system as claimed in claim 1 wherein said filtering means is a device whose frequency response characteristics are steplessly controlled in response to the output from said detecting means.

5. A system as claimed in claim 1 wherein said filtering means is a device whose frequency response characteristics are controlled stepwisely in response to the output from said detecting means.

6. A system as claimed in claim 5 wherein said detecting means has a position detecting means for generating a position signal relating the position of the brake pedal, means responsive to said position signal for producing a rate signal relating to the operating speed of the brake pedal and a discriminating means responsive to the rate signal for discriminating whether or not the operating speed of the brake pedal is more than a predetermined level, whereby the frequency response characteristics of said filtering means are changed in response to the output from said discriminating means.

7. A method for carrying out a gear change operation in a vehicle automatic transmission system, comprising,
producing a condition signal relating to the speed of an internal combustion engine for providing power to the vehicle,
detecting the operating speed of a brake pedal of the vehicle with detecting means,
removing a high frequency component from the condition signal with filtering means responsive to the condition signal, the frequency response characteristics of the filtering means being changeable in response to the output from the detecting means, and
producing a control signal with control means responsive to the output from the filtering means, the control signal operating actuating means for carrying out the gear change.

* * * * *